United States Patent [19]

Wagner

[11] Patent Number: 5,757,084

[45] Date of Patent: May 26, 1998

[54] WHEEL HUB ASSEMBLY AND METHOD OF INSTALLING A HUB ON AN AXLE

[75] Inventor: Mark Wagner, Beaverton, Oreg.

[73] Assignee: Consolidated Metco, Inc., Portland, Oreg.

[21] Appl. No.: 528,738

[22] Filed: Sep. 15, 1995

[51] Int. Cl.⁶ ................................................. B60B 37/10
[52] U.S. Cl. ................ 301/105.1; 301/131; 29/894.361; 29/898.07
[58] Field of Search .................. 301/105.1, 111, 301/124.1, 131, 126, 137; 384/448; 29/894.321, 894.361, 898.078

[56] References Cited

U.S. PATENT DOCUMENTS

| | | | |
|---|---|---|---|
| 698,944 | 4/1902 | Heinzelman et al. | |
| 1,055,849 | 3/1913 | Zahn | |
| 2,087,684 | 7/1937 | Grimaldi | 301/126 X |
| 2,622,934 | 12/1952 | Phelps | 301/105 |
| 3,156,506 | 11/1964 | Scheifele et al. | 308/211 |
| 3,996,966 | 12/1976 | Princell | 138/89 |
| 4,552,367 | 11/1985 | Fedorovich et al. | 277/1 |
| 4,811,992 | 3/1989 | Steiner | 301/105 |
| 4,900,166 | 2/1990 | Candiard | 384/560 |
| 4,995,736 | 2/1991 | Haase | 384/448 |
| 5,174,839 | 12/1992 | Schultz et al. | 152/415 |
| 5,184,402 | 2/1993 | Kadokawa | 29/898.07 |
| 5,328,275 | 7/1994 | Winn et al. | 384/472 |
| 5,386,630 | 2/1995 | Fox | 29/898.07 X |

OTHER PUBLICATIONS

ConMet Product Brochure, 8 pages (undated).
Timken Brochure, 4 pages (undated).

*Primary Examiner*—Russell D. Stormer
*Attorney, Agent, or Firm*—Klarquist Sparkman Campbell Leigh & Whinston

[57] ABSTRACT

A wheel hub has inboard and outboard bearings separated by a spacer. A temporary alignment member is located against an inner surface of the spacer and an inner surface of the outboard bearing thus aligning the inner surfaces of the spacer and the bearing. A cap is located on an outboard surface of the hub to hold the outboard bearing in place. The cap includes a hole large enough for the alignment member to pass through. The hub may be easily mounted onto an axle merely by locating an inboard opening of the hub over the axle and sliding the hub onto the axle. As the axle enters the hub it eventually contacts the alignment member and begins moving the alignment member outward through the hole in the cap. As the alignment member moves outward the axle refills the space immediately vacated by the alignment member. The hub is then further pushed onto the axle so that the alignment member falls away and the axle protrudes through the hole in the cap. The cap is then removed and a nut is installed on the axle and tightened.

24 Claims, 4 Drawing Sheets

5,757,084

WHEEL HUB ASSEMBLY AND METHOD OF INSTALLING A HUB ON AN AXLE

BACKGROUND OF THE INVENTION

1. Field of the Invention

This invention pertains generally to a wheel hub assembly and method for installing a wheel hub onto an axle and more particularly pertains to installing a heavy-duty wheel hub having bearing assemblies onto an axle.

2. Description of the Related Art

Mounting a hub onto an axle requires a certain degree of finesse. Many heavy-duty hubs have inboard and outboard tapered roller bearings that must be properly positioned and tightened to insure that the hub is securely attached to the axle, but freely able to spin.

Because of the size and weight of most heavy-duty hubs, it is necessary for the installer to use both hands. During installation the hub can become misaligned with the axle causing damage to a bearing seal. Also, as the axle enters the hub, past the inboard bearing, it becomes difficult for the installer to align the outboard bearing, further making it common to jam the inboard bearing on the axle. Finally, mounting the outboard bearing onto the axle is difficult without a means to align it with the axle. Such difficulties increase the time to install the hub, which adds expense to vehicle manufacturers.

SUMMARY OF THE INVENTION

Accordingly, there is a need in the industry to provide a hub and hub installation method which is directed toward overcoming the difficulties of mounting a hub onto an axle. The present invention provides a wheel hub having a hub body with a centrally located axially extending axle bore or cavity within which are mounted an outboard and an inboard bearing assembly. Typically a spacer is provided between the bearing assemblies.

The hub is also provided with a temporary alignment member, such as a plug or sleeve, that is inserted into the bore and positioned to engage at least the outboard bearing and the spacer at its outboard end. The alignment member maintains the orientation, and preferably the flush alignment, of inner surfaces of the spacer and the outboard bearing so that as the hub is mounted onto an axle, the axle can slide easily along the inner surface of the spacer into the outboard bearing.

In addition, a cap is coupled to the outboard end of the hub body and holds the outboard bearing in position during installation of the hub on the vehicle axle. The cap preferably includes a hole that is large enough for passage of the alignment member through the hole and also for passage of the axle, but not large enough to allow the outboard bearing to pass through it.

By its very nature, the spacer, if used, is not connected to the bearings but is free floating. Accordingly, without the alignment member, the spacer could shift transversely relative to the axle bore and the axle would have a tendency to catch an inner edge of the outboard bearing assembly or move the bearing out of its race, thereby frustrating installation. The present invention prevents this because the temporary alignment member maintains the alignment of the outboard end of the spacer and the outboard bearing. Hub installation is thus greatly simplified because the axle follows an inside surface of the spacer into the outboard bearing as the hub is pushed onto the axle.

Accordingly, during installation, the axle can follow the inner surface of the spacer until it encounters the temporary alignment member. The installer then applies slight additional pressure on the hub and the axle will begin moving the alignment member outwardly through the hole in the cap. Less advantageously, the alignment member may also be manually removed at such a time, but this prevents a single installer from supporting the hub with both hands during hub installation. The temporary alignment member thus maintains the alignment of the outboard bearing and spacer until the axle displaces it, at which point the axle itself is properly aligned with the outboard bearing. Further pushing by the installer allows the axle to protrude through the hole in the cap at which time the cap may be removed and the hub secured to the axle with a retaining nut.

The temporary alignment member may be in the form of a sleeve, plug, or other shape (such as a triangular cross-section) that is able to fit, and couple to, or otherwise engage an inner surface of the outboard bearing and spacer.

Various advantages and features of novelty which characterize the invention are particularized in the claims forming a part hereof. However, for a better understanding of the invention and its advantages, reference should be had to the drawings and to the accompanying description in which there is illustrated and described preferred embodiments of the invention.

DETAILED DESCRIPTION OF THE PREFERRED EMBODIMENTS

Figure 1:
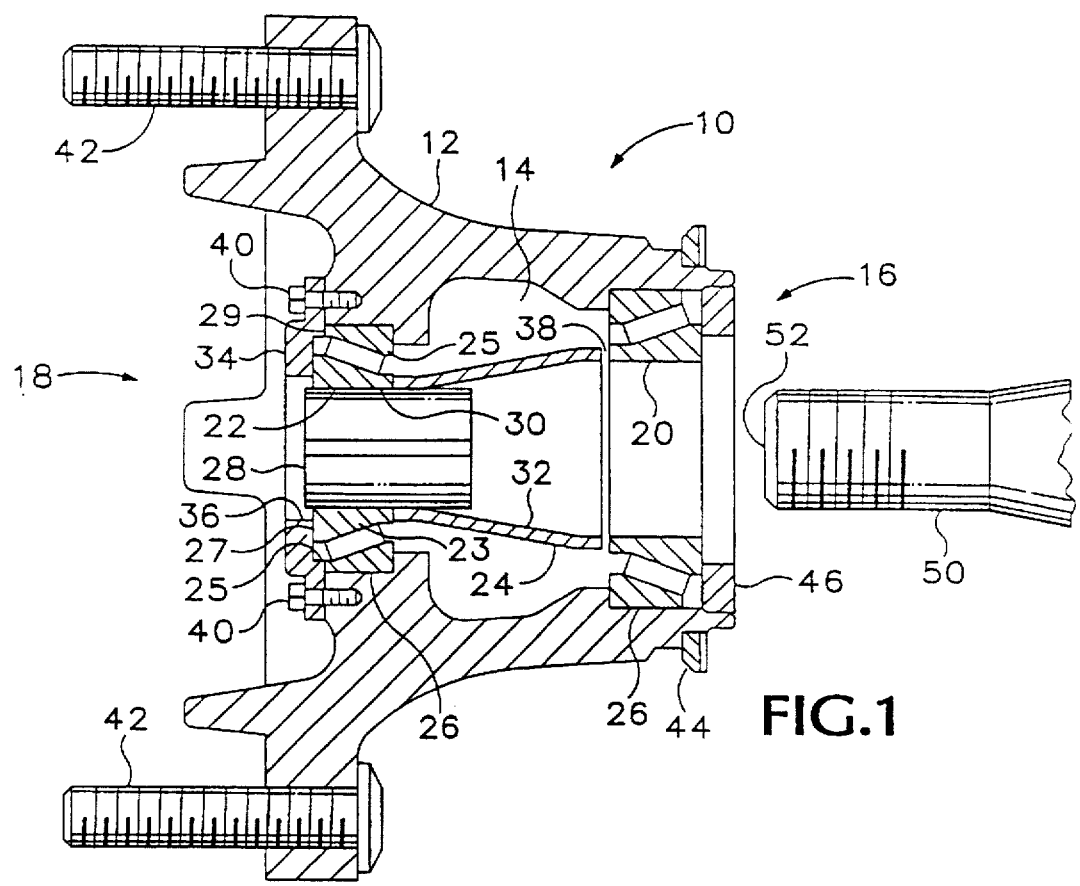
FIG. 1 is a cross-section view of a hub in accordance with one embodiment of the present invention and also showing a portion of an axle poised to enter an inboard side of the hub.
Figure 2:
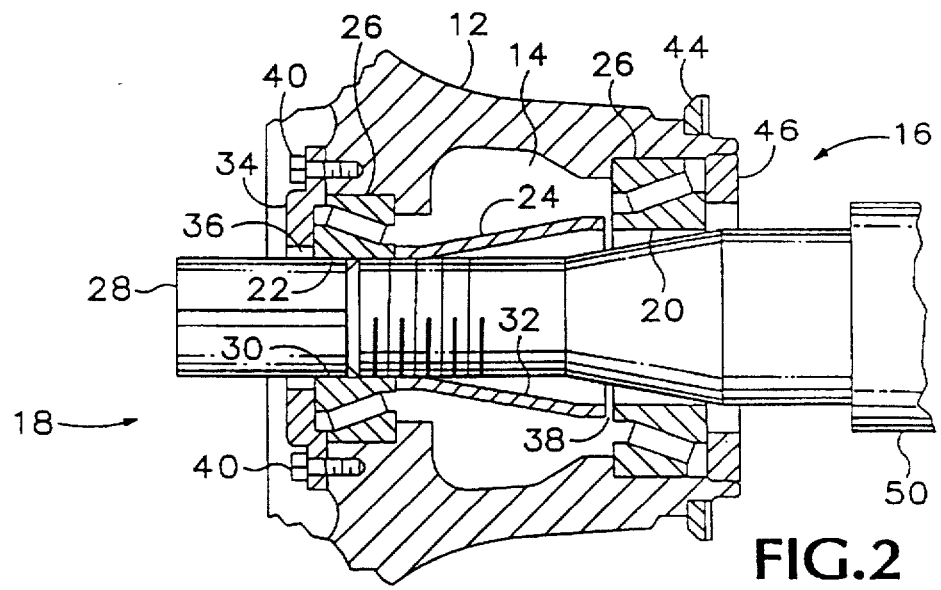
FIG. 2 is a partial cross-section view of the hub of FIG. 1 wherein the axle is partially located into the hub and is pushing a temporary alignment member outward.
Figure 3:
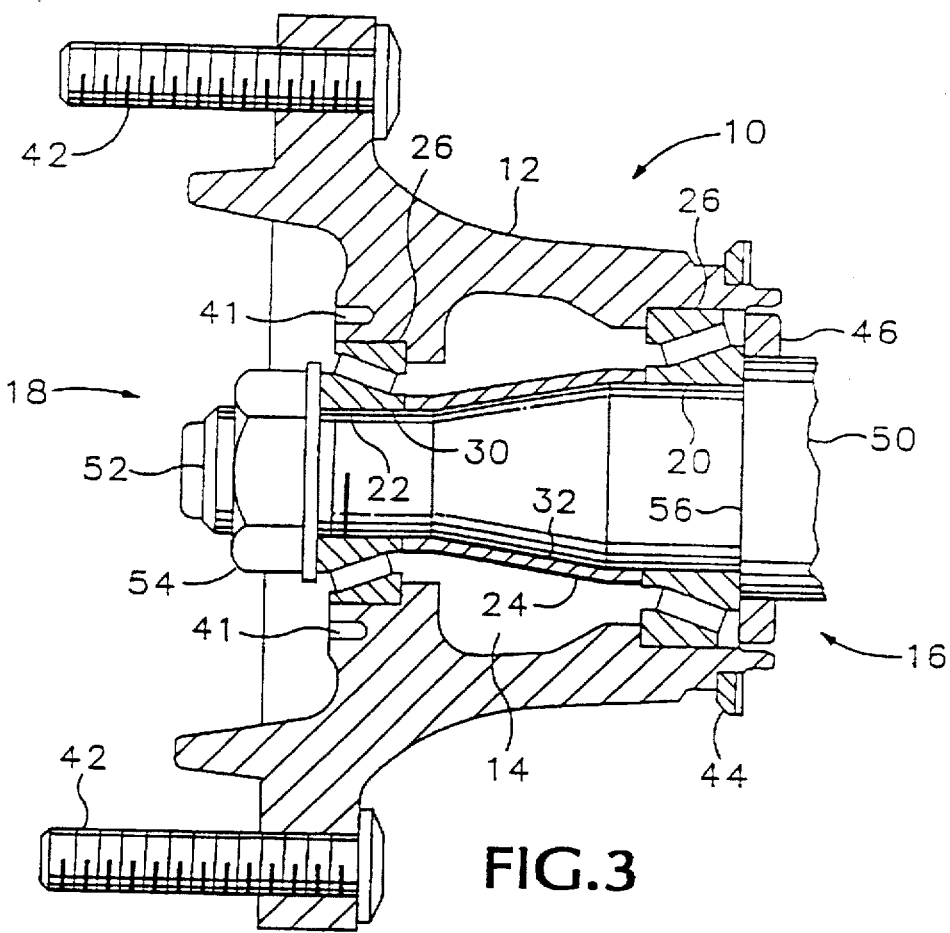
FIG. 3 is a cross-section view of the hub of FIG. 1 wherein the hub is fully installed on the axle.

FIGS. 1–3 show a cross-section, or a portion thereof, of a hub assembly 10 and its installation sequence. The hub assembly 10 is intended for use with a single wheel unit such as is commonly found on the front wheels of trucks. The hub 10 includes a main body 12 which includes an axial bore 14 extending from an inboard side 16 to an outboard side 18 of the hub. Within the bore 14 are an inboard bearing assembly 20, an outboard bearing assembly 22 and a spacer 24. The bearings 20, 22 are tapered roller bearings mounted on beveled races or cups 26.

With reference to FIG. 1, the outboard bearing assembly 22 has an inner race 23 and an outer race 25. The inner race 23 has an outboard end surface 27, and the outer race 25 has an outboard end surface 29. As can be seen in this figure, the end cap constitutes a form of a bearing retainer which applies a bearing retaining force to the end surface 27 to hold the inner race 23 in place as the alignment member 28 is pushed clear of the assembly as shown in FIG. 2 and explained below. In the illustrated form, a similar force is also applied against end surface 29. As is conventional, tapered roller bearings have separable inner and outer races. Consequently, if separable bearings are used of the form shown in FIG. 1, the application of a bearing retaining force to inner race 23 is necessary with this type of separable bearing to prevent the race 23 from moving with the alignment member and away from the assembly.

Also located within the bore 14 is a temporary alignment member 28 (shown in one preferred embodiment as a sleeve 28) which is in contact with an inside surface 30 of the outboard bearing and an inside surface 32 of the spacer 24. Preferably, the sleeve 28 is radially resilient so that it may be radially compressed and inserted into the outboard bearing 22 and spacer 24 and thereafter released so it expands to be in frictional contact with the inner surfaces 30 and 32. The sleeve 28 thereby maintains a flush alignment of the inner surface 30 of the outboard bearing 22 with the inner surface 32 of the spacer 24 at the spacer's outboard end. Additionally, due to the holding power of the frictional fit of the sleeve with the spacer and outboard bearing, an inboard end of the spacer 24 is also urged into approximate flush alignment with the inboard bearing 20.

Affixed or otherwise directly or indirectly coupled to the outboard end 18 of the hub body 12 is a cap 34 that holds the outboard bearing 22 in place. The cap 34 may be provided with a recess 25 to receive the outboard surface of the bearing. The cap may be of any convenient shape, but is typically annular. The cap includes an aperture 36 that is positioned relative to the bore (e.g., overlaying the bore opening) and large enough to allow the sleeve 28 to pass through it, yet the hole 36 is small enough so that the cap 34 is able to securely maintain the outboard bearing 22 in its bearing cup 26. Preferably, the cap 34 is attached to the hub body 12 by means of a plurality of bolts 40 (or plastic clips, not shown) which pass through the cap and into threaded bores 41 in the body 12.

As noted, the spacer 24 is located between the inboard bearing 20 and the outboard bearing 22, and in this embodiment is tapered from the inboard bearing to the outboard bearing. Other configurations of spacers may be used, although the tapered inner surface assists in guiding the end of the axle through the bore during installation. When the hub is being shipped, the spacer is held in place by the sleeve 28.

In the illustrated embodiment with tapered bearings, the spacer is preferably slightly shorter than a distance between the inboard and outboard bearings when the bearings are not subjected to axial forces. That is, without axial pressure on the bearings the spacer will not contact both the inboard bearing and the outboard bearing simultaneously. Thus, a small space 38 is created at one end or the other between the spacer 24 and its adjacent bearing 20 or 22. As shown in FIG. 1, for example, the space 38 is located between the inboard end of the spacer 24 and the inboard bearing 20. As will be explained below in greater detail, the length of the spacer 24 and the attendant space 38 is provided so that as the hub is tightened onto the axle, the bearings can shift slightly in their cups 26 and move toward one another to adjust the bearings. However, the length of the spacer limits the amount of axial movement of bearings.

As shown in FIGS. 1-3, the hub also includes wheel mounting studs 42 for connecting a wheel to the hub. In addition, an ABS (anti-lock brake system) tone ring 44 is mounted at the inboard end of the body 12. An oil seal 46 is also preferably mounted at the inboard end of the body to retain inboard bearing 20 in its cup 26.

A preferred method of installing the hub onto a wheel axle 50 will now be explained with reference to FIGS. 1-3 in sequence. Beginning with FIG. 1, the hub 10 is adjacent the end 52 of axle 50 so that the hub's inboard opening of the bore 14 is facing the axle. Thereafter, the hub is pushed onto the axle 50 so that the axle end 52 enters the bore 14 through its inboard end. The end 52 of the axle may contact the inner surface 32 of the spacer 24 and be guided by this surface as the installer slides the hub further onto the axle 50. Eventually, the axle end 52 will come into contact with the sleeve 28.

The installer then needs to apply slightly more pressure so that the axle 50 begins to force the sleeve 28 outward through the aperture 36 in the cap as is shown in FIG. 2. The sleeve 28 will maintain the alignment of the inner surfaces 30 and 32 of the outboard bearing and the spacer, respectively, until the axle 50 pushes the sleeve 28 past the spacer 24, at which point the axle is aligned with the outboard bearing 22. The installer then continues to push the hub onto the axle and the sleeve 28 passes completely through the aperture 36 and falls away.

Thereafter, continued pushing by the installer will cause the axle 50 to protrude through the hole 36. The installer then firmly seats the bearings onto the axle and removes the cap 34. An axle nut 54 is then threaded onto the axle and tightened. As the nut 54 is tightened it bears against an outboard surface of the outboard bearing 22 thereby pressing the roller bearing firmly into its cup 26. Meanwhile, the inboard bearing 20 has an inboard end that is pressing against a shoulder 56 of the axle 50. Accordingly, tightening the axle nut 54 causes the bearings 20 and 22 to become seated in their respective cups 26. Thus, the bearings are moved toward one another through the distance of the space 38; that is, until both bearings come into contact with the ends of the spacer 24 as shown in FIG. 3. Thereafter, continued tightening of the nut 54 to the desired torque completes the bearing adjustment.

Figure 4:
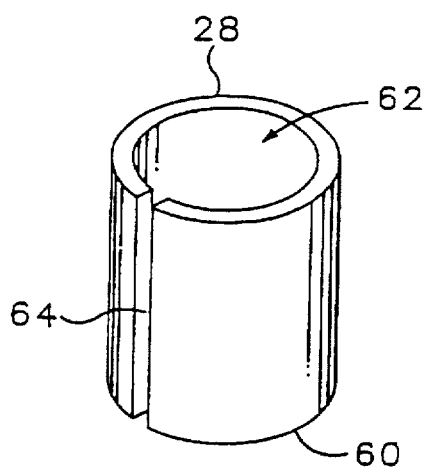
FIG. 4 is a perspective view of a preferred embodiment of one form of a temporary alignment member of the present invention.
Figure 5:
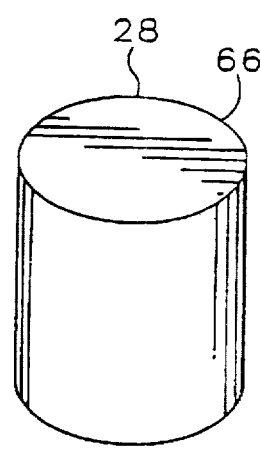
FIG. 5 is a perspective view of an alternative preferred embodiment of the temporary alignment member of the present invention.
Figure 9:
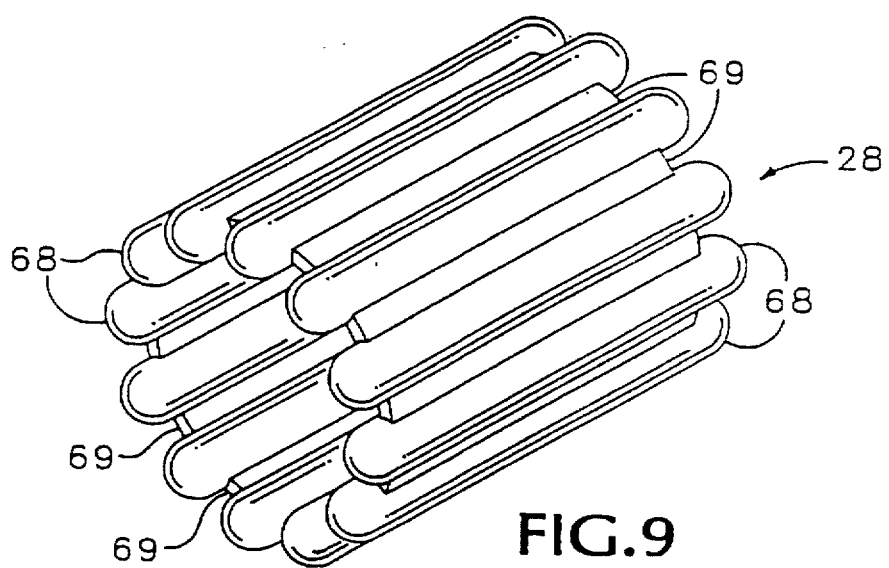
FIG. 9 is a perspective view of an alternate embodiment of a temporary alignment member.

Preferred embodiments of the temporary alignment member 28 are shown in FIGS. 4, 5 and 9. In FIG. 4, the alignment member 28 is tubular (the sleeve) having an outer wall 60 defining a central opening 62. The wall 60 is provided with a slit 64 and is made of a material that is somewhat resilient. Accordingly, the slit 64 allows the alignment member 28 to be radially resilient. A suitable material for this purpose is ABS tubing having a proper diameter. The outer cross-sectional dimension, in this case the outer diameter, when uncompressed or unreduced is slightly larger than the inner diameter of bearing 22 and the outboard end of sleeve 28. When inserted in place, the diameter of the sleeve is reduced and the resilient nature of the sleeve causes it to bear against the spacer and bearing to be held in place.

In FIG. 5, the alignment member 28 is represented as a cylinder or plug 66 of resilient material such as styrofoam.

rubber, or other elastomeric material. Alternatively, the alignment member 28 could have a triangular or other non-circular cross-section. In addition, a properly sized inflatable object may have the correct properties to become the alignment member 28.

In FIG. 9 the alignment member 28 is a molded or extruded plastic having a plurality of longitudinal ribs 68 spaced apart by intermediate webs 69. A suitable material is chosen so that the alignment member is radially resilient.

In general, the alignment member 28 may be of any shape which holds the desired bearing and spacer components in alignment and of a design such that it remains in position, either by frictional contact or otherwise during shipment of the hub assembly.

Figure 6:
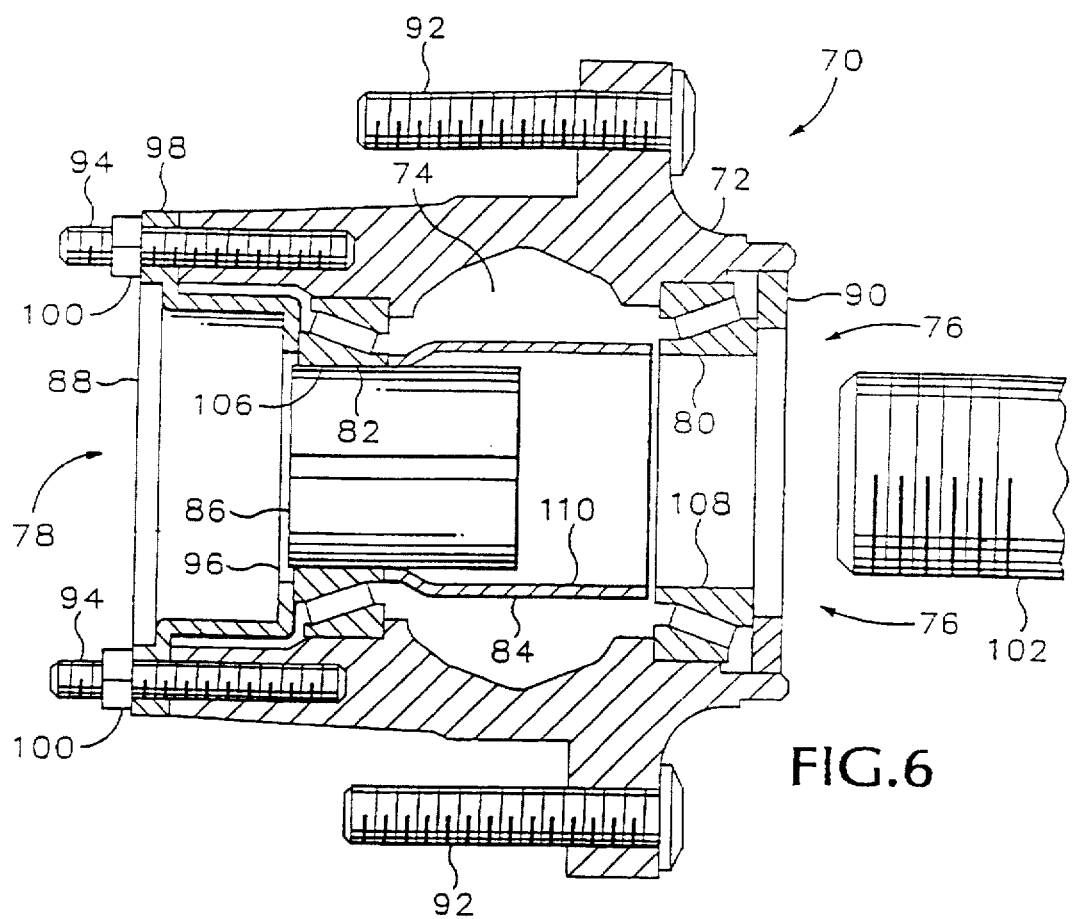
FIG. 6 is a cross-section view of an alternative embodiment of a hub of the present invention wherein the hub is designed to attach to tandem wheels to illustrate the ready applicability of the invention to various hub styles. A portion of an axle is shown poised to enter the hub at an inboard side of the hub.
Figure 7:
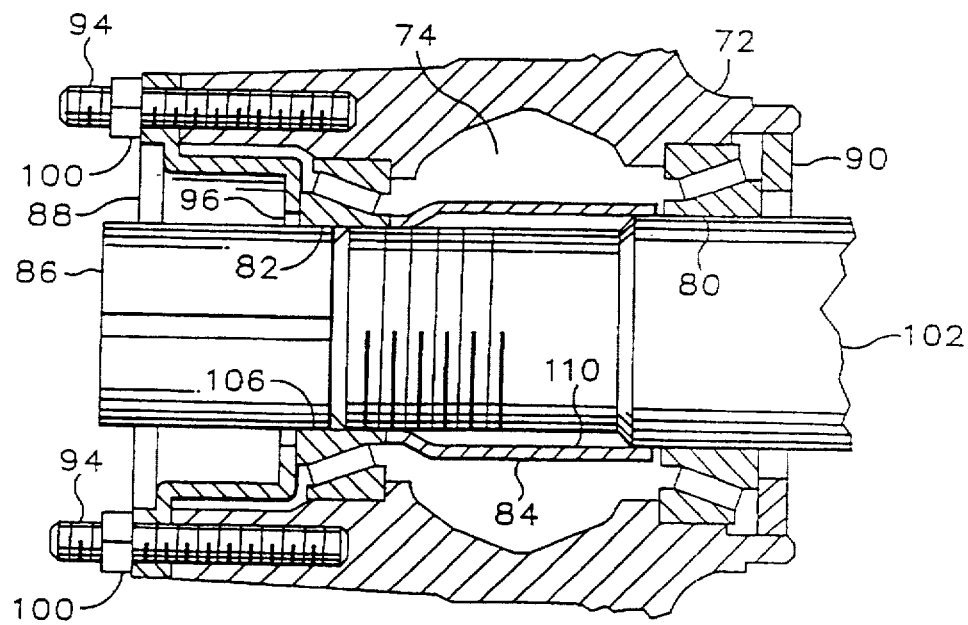
FIG. 7 is a partial cross-section view of the hub of FIG. 6 wherein the axle is partially located in the hub and is pushing a temporary alignment member outward.
Figure 8:
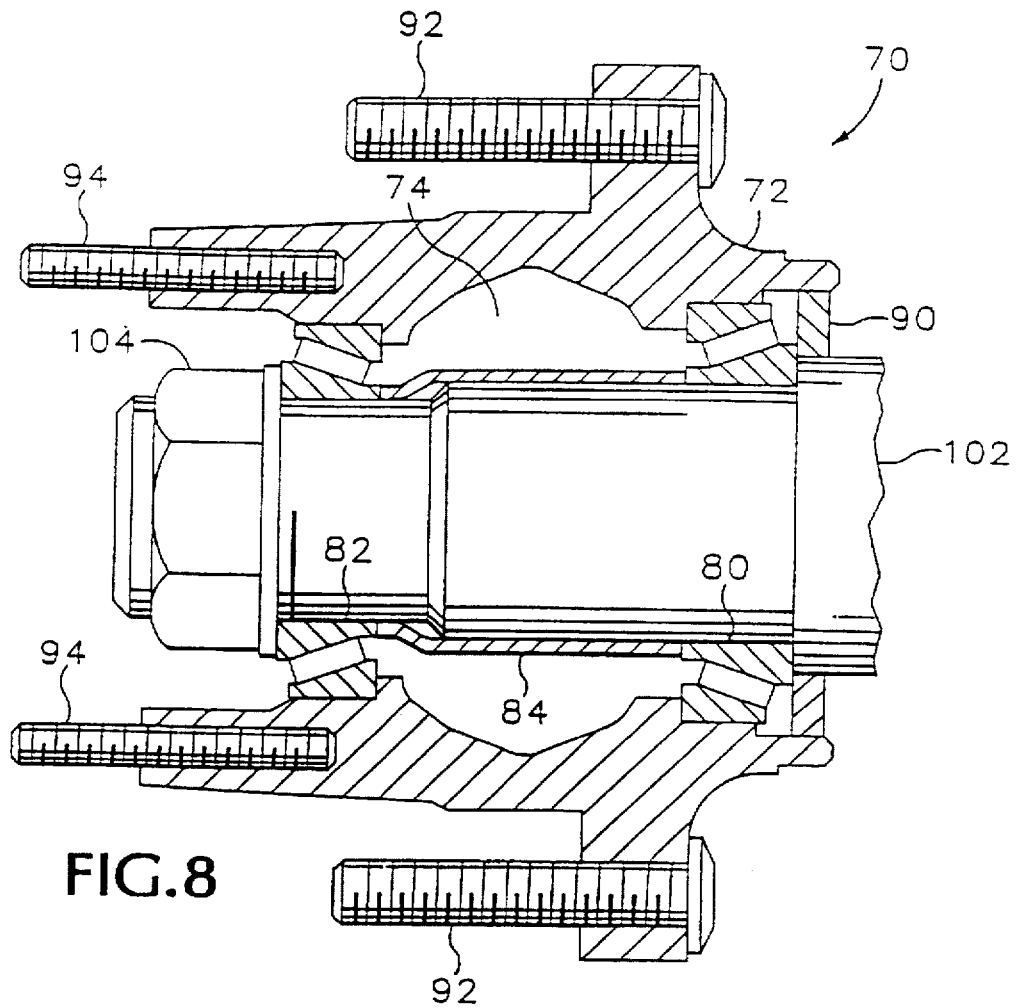
FIG. 8 is a cross-section view of the hub of FIG. 6 showing the hub fully installed on the axle.

FIGS. 6–8 show a cross-section of a hub 70 of the type that is designed to attach to double, or tandem, wheel units. In many respects the hub 70 has many functional characteristics in common with the hub 10 shown in FIGS. 1–3. The hub 70 includes a hub body 72 having an axial bore 74 extending from an inboard end 76 to an outboard end 78. Also, as before, within the bore 74 is an inboard bearing assembly 80, an outboard bearing assembly 82 and a spacer 84.

The hub also includes a temporary alignment member, again represented as a sleeve 86 and a cap 88 near the outboard end 78. In addition, as before, the hub includes an oil seal 90 at the inboard end 76 to hold the inboard bearing 80 in its cup.

Significant differences between the hub 70 and the hub 10 include a double set of wheel studs 92 and 94 for connecting to wheels and the drive axle. Accordingly, the different geometry required for the double set of studs also requires that the cap 88 be correspondingly differently shaped. As shown, the cap is substantially cup-shaped having an aperture 96 near the outboard bearing 82. The cap 88 also includes a flange 98 having a plurality of holes so that it may fit down over the studs 94. Nuts 100 thread onto the studs 94 and hold the cap 88 in place. Of course, the cap may be otherwise held in place.

Additionally, the spacer 84 is of a different configuration to accommodate the configuration of the hub 70. However, as before, the spacer is tapered from its inboard end to its outboard end so that it may be in flush alignment with an inner surface 106 of the inboard bearing 80 and an inner surface 108 of the outboard bearing 82. Also, this tapered shape again assists in guiding the end of the axle through the hub assembly during installation. The sleeve 86 holds the outboard end of the spacer 84 in flush alignment with the outboard bearing 82.

Installation of the hub 70 is substantially as described above in connection with hub 10. Initially, the inboard end 76 of the hub 70 is located near an axle 102 and the hub is pushed onto the axle so that the axle enters the bore 74. The axle may slide along the inside surface 110 of the spacer 84 until it comes into contact with the sleeve 86. Thereafter, continued pushing on the hub will cause the axle to eject the sleeve 86 through the cap's aperture 96 so that the axle engages the inner surface 106 of the outboard bearing 82 just as the sleeve 86 evacuates that location insuring that the axle 102 slides easily and surely through the bearing 82.

By continuing to push the hub onto the axle, the installer will cause the sleeve 86 to fall away and thereafter the axle 102 will protrude through the aperture 96 in the cap 88. As before, in this type of a hub, an axle nut 104 is threaded onto the axle and tightened eventually causing the bearings 80 and 82 to more toward one another until they contact both ends of the spacer 84.

It should be noted that many details of hub mounting have been left out of the above description as they are considered well known in the art. For example, axle nuts will typically be secured to the axle through one or more commonly known means such as the use of castellated nuts and cotter pins, locking nuts, or other means of securement. Additionally, it is necessary to pack the hub with grease or oil before use. There are many other expedients well known to those versed in the art which are outside the subject of the invention.

Numerous characteristics and advantages of the invention have been set forth in the foregoing description, together with details of the structure and function of the invention. The novel features hereof are pointed out in the appended claims. The disclosure is illustrative only, and changes may be made in detail, especially in matters of shape, size, and arrangement of parts within the principle of the invention to the full extent indicated by the broad general meaning of the terms in the claims. For example, the invention is not limited to the hub designs, caps, alignment members and bearing types of the illustrated embodiments.

I claim:

1. A method of installing a wheel hub onto an axle, the wheel hub including a hub body having a bore defining a longitudinal axis and extending from an inboard to an outboard side of the hub body, an inboard bearing assembly and an outboard bearing assembly that are longitudinally spaced apart and located within the bore, and an open-ended tubular spacer located within the bore between the bearing assemblies, wherein the bearing assemblies and the spacer have inner surfaces defining an inner bore surface, and a temporary alignment member located within the bore and against the inner surfaces of the spacer and the outboard bearing assembly, and a shipping cap coupled to the outboard side of the body wherein the cap defines an aperture positioned to overlay the bore, the method comprising the steps:

(a) locating an inboard side of the bore about an axle;

(b) moving the hub onto the axle so as to bring the axle into contact with the alignment member;

(c) pushing the hub further onto the axle thereby sliding the alignment member along the inner surface of the outboard bearing assembly;

(d) pushing the hub further onto the axle thereby sliding the alignment member through the aperture in the cap until the axle protrudes through the aperture; and (e) removing the cap and affixing the axle to the hub by a mechanical connection.

2. The method of claim 1 including the step of maintaining the alignment of the spacer and outboard bearing with the alignment member until the axle pushes the alignment member past the spacer.

3. The method of claim 1 including the step of guiding the axle by the inner surface of the spacer to the inner surface of the outboard bearing assembly.

4. The method of claim 1 including the step of providing a spacer with a tapered inner surface and guiding the axle by the inner surface of the spacer to the inner surface of the outboard bearing assembly.

5. The method of claim 1 including the step of radially compressing the alignment member against the inner surfaces of the outboard bearing assembly and the spacer.

6. A method of installing a wheel hub on an axle, the wheel hub including a hub body having a bore extending from an outboard side of the body to an inboard side of the body, the hub further including an inboard bearing and an outboard bearing, and a spacer located between the bearings and within the bore wherein the spacer and the bearings define an inner surface within the bore for receiving the axle, the method comprising:

(a) installing a temporary alignment member into the bore to be in contact with the inner surface of the spacer and a bearing thereby causing the spacer and bearing to be in alignment;

(b) installing a cap on the body, the cap having an aperture that is large enough to receive the alignment member therethrough;

(c) positioning the inboard side of the bore onto the axle and guiding the hub further onto the axle; and (d) removing the alignment member through the aperture in the cap whereby the alignment of the spacer and bearing is maintained by the alignment member as the alignment member moves past the spacer.

7. The method of claim 6 wherein the step of removing the alignment member comprises pushing the hub onto the axle until the axle pushes on the alignment member and further pushing the hub onto the axle so that the axle pushes the alignment member through the aperture in the cap whereby the alignment member maintains alignment of the bearing until the axle is partially engaged with the inner surface of the bearing.

8. The method of claim 7 further comprising the step of pushing the hub further onto the axle until the alignment member is disinstalled from the hub and the axle protrudes at least partially through the aperture in the cap.

9. The method of claim 6 further comprising the step of removing the cap and attaching the hub to the axle by a mechanical connector.

10. A wheel hub providing easy mounting onto an axle, comprising:

(a) a hub body having an inboard side and an outboard side and a longitudinal bore through the body from the inboard side to the outboard side;

(b) a first bearing assembly and a second bearing assembly in spaced apart arrangement located within the bore, the bearing assemblies having inner surfaces;

(c) a spacer located within the bore and between the bearing assemblies, the spacer having an outboard end including an inner surface that is in flush alignment with the inner surface of the first bearing assembly;

(d) a temporary alignment member frictionally engaging the inner surface of the spacer and at least the first bearing assembly to maintain the inner surface of the spacer in flush alignment with the inner surface of the first bearing assembly; and (e) a cap coupled to the body in a position to retain the first bearing assembly within the bore.

11. The hub of claim 10 wherein the cap has an aperture overlying the bore and sized large enough for passage of an end of an axle through the aperture as the hub is installed onto the axle.

12. The hub of claim 10 wherein the spacer is tapered from inboard to outboard and the alignment member is located at the outboard end of the spacer and the cap is located at the outboard side of the body.

13. The hub of claim 10 wherein the alignment member has an outer cross-sectional dimension and the cap aperture has a cross-sectional dimension that is larger than the outer cross-sectional inversion of the alignment member and positioned so as to permit passage of the alignment member through the cap aperture as the hub is installed into the axle.

14. The hub of claim 10 wherein the alignment member is tubular having a slit along its length so that the alignment member is radially resilient.

15. The hub of claim 10 wherein the alignment member is substantially cylindrical having a diameter which is reducible in its cross-sectional dimension, the alignment member having an unreduced outer diameter that is larger than the inner diameter of the first bearing assembly.

16. A wheel hub assembly which is ready to install onto the end of an axle, comprising:

(a) a hub body having an inboard side and an outboard side and defining an axially extending axle bore;

(b) an inboard bearing positioned within the axle bore and an outboard tapered roller bearing positioned within the axle bore and having an inner race with an outboard end surface and an outer race; and (c) a a bearing retainer coupled to the outboard side of the hub in a position to cause a bearing retaining force to be applied to outboard end surface of the inner race of the outboard bearing assembly to retain the outboard bearing within the axle bore.

17. The ready to install wheel hub assembly according to claim 16 in which the bearing retainer includes an opening sized at least as large as a cross-sectional dimension of the outboard most portion of the axle bore and which overlies the axle bore, and wherein the bearing retainer is shaped to permit insertion of the end of the axle through the opening and beyond the portion of the bearing retainer defining the opening to a position such that a mechanical connector may be applied to the end of the axle.

18. The ready to install wheel hub assembly according to claim 16 including a temporary alignment member positioned at least partially within the axle bore and engaging at least one of the bearing assemblies to retain the engaged bearing in an aligned position within the bore.

19. The ready to install wheel hub assembly according to claim 16 including a spacer located within the axle bore between the inboard bearing and outboard bearing and including a temporary alignment member engaging the spacer and at least one of the bearings so as to retain the alignment of the spacer with the engaged bearing.

20. A wheel hub assembly which is ready to install onto the end of an axle, comprising:

(a) a hub body having an inboard side and an outboard side and defining an axially extending axle bore;

(b) an inboard bearing positioned within the axle bore and an outboard bearing positioned within the axle bore; and (c) a cap coupled to the outboard side of the hub in a position to retain the outboard bearing within the axle bore; and in which the cap is a temporary cap which is detachably coupled to the wheel hub and removable following installation of the wheel hub onto the axle.

21. A wheel hub assembly according to claim 20 in which the outboard bearing has an inner race and an outer race, the inner race having an outboard end, the cap being shaped and positioned to apply a retaining force to the outboard end of the inner race.

22. A wheel hub assembly according to claim 21 in which the cap defines an axle pass-through passage through which the axle passes during installation of the wheel hub assembly.

23. A wheel hub assembly according to claim 21 in which the outer race also has an outboard end, the cap being shaped and positioned to apply a retaining force to the outboard ends of both the inner and outer races.

24. A wheel hub assembly according to claim 21 in which the cap abuts the outer end of the inner race.

* * * * *